(12) United States Patent
Sommerville

(10) Patent No.: US 7,357,304 B2
(45) Date of Patent: Apr. 15, 2008

(54) SECURITY MEANS FOR A SPRAY DISPENSER

(75) Inventor: David Sommerville, Edinburgh (GB)

(73) Assignee: NCR Corporation, Dayton, OH (US)

( * ) Notice: Subject to any disclaimer, the term of this patent is extended or adjusted under 35 U.S.C. 154(b) by 214 days.

(21) Appl. No.: 11/130,588

(22) Filed: May 17, 2005

(65) Prior Publication Data

US 2005/0269345 A1    Dec. 8, 2005

(30) Foreign Application Priority Data

Jun. 4, 2004    (GB)    ................... 0412569.6

(51) Int. Cl.
*G07F 19/00*    (2006.01)

(52) U.S. Cl. ................... 235/379; 235/482; 109/19; 705/43

(58) Field of Classification Search .................... 902/8, 902/9, 14; 109/19, 2; 235/482, 483; 705/43
See application file for complete search history.

(56) References Cited

U.S. PATENT DOCUMENTS 4,069,773 A * 1/1978 Clark ........................... 109/19
4,149,474 A * 4/1979 Ruane ........................... 109/19
4,251,009 A * 2/1981 McLaughlin et al. ......... 221/12
4,303,021 A    12/1981 Bourlier et al.
5,454,332 A    10/1995 Fennelly et al.

FOREIGN PATENT DOCUMENTS

| DE | 2120406 | 11/1972 |
|---|---|---|
| EP | 0 503 636 A1 | 9/1992 |
| FR | 2 740 585 | 4/1997 |
| GB | 2 172 729 A | 9/1986 |
| WO | WO 89/03102 | 4/1989 |

OTHER PUBLICATIONS

Patent Abstracts of Japan, vol. 1999, No. 04, Apr. 30, 1999 & JP 11 003450 A (Toshiba Corp) Jan. 6, 1999.

* cited by examiner

*Primary Examiner*—Seung Ho Lee
(74) *Attorney, Agent, or Firm*—Michael Chan

(57) ABSTRACT

A security means comprises a spray tray; a dispenser slot positioned so as to dispense media into the spray tray; and a security cover positioned to cover said spray tray and slot. The cover is arranged so as to cause a sweep member to sweep past the dispenser slot and thus dislodge any foreign body adjacent the slot, when the cover is moved between closed and opened positions.

6 Claims, 2 Drawing Sheets

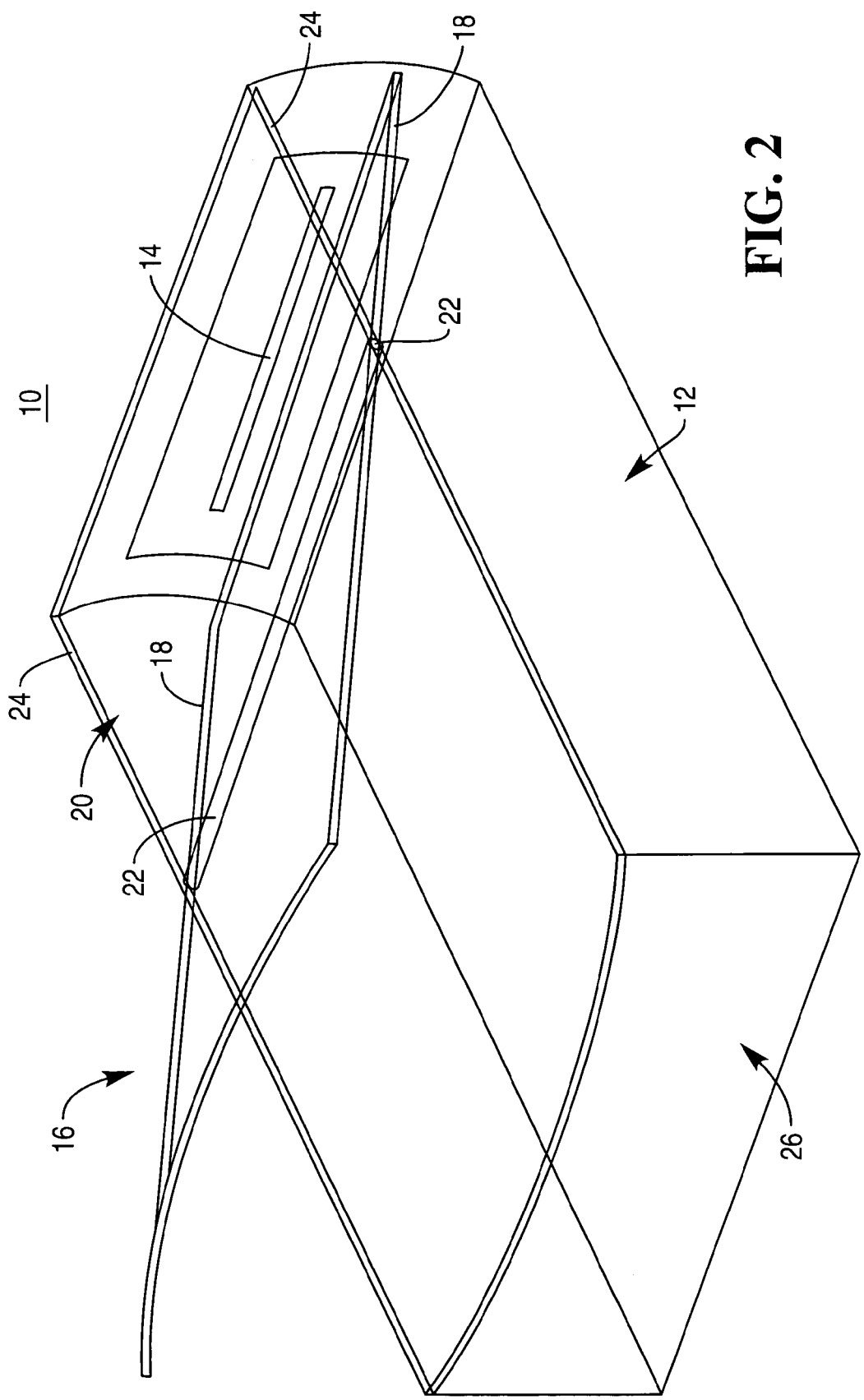

SECURITY MEANS FOR A SPRAY DISPENSER

BACKGROUND

The present application relates to a security means for an Automated Teller Machine (ATM) spray dispenser.

Fraud at ATMs is an increasing concern to financial service providers with ATM networks. In particular, there is concern regarding fraud relating to tampering with the mechanism for dispensing banknotes.

In so-called spray dispensers the notes are not presented to the user in a pre-formed bunch, rather they are sprayed from a dispense slot, in the fascia of the ATM, into a spray tray from where they are collected by the user. However, fraudsters have been known to fit a cover over the dispenser slot. Thereafter, when the dispenser mechanism ejects banknotes, they are sprayed into the space between the dispenser slot and the cover. As the user can not see the notes he or she assumes that the dispenser malfunctioned and while they go off to complain the fraudsters return, remove the cover and steal the dispensed cash.

SUMMARY

It is an object of the present invention to ameliorate the aforementioned problem.

According to a first aspect of the present invention there is provided a security means comprising a spray tray; a dispenser slot positioned so as to dispense media into the spray tray; and a security cover positioned to cover said spray tray and slot; the cover being arranged so as to cause a sweep member to sweep past the dispenser slot and thus dislodge any foreign body adjacent the slot, when the cover is moved between closed and opened positions.

Preferably, the cover is further arranged to prevent access to the dispenser slot, when in the opened position.

Preferably, the cover is pivotally mounted, such that a portion of the cover forms the sweep member.

Preferably, the cover is further arranged to enable access to at least a forward portion of the spray tray when the cover is in the closed position. Most preferably, access is available through an opening in the cover.

Preferably, the cover is formed from transparent plastic material.

According to a second aspect of the present invention there is provided an Automated Teller Machine (ATM) having a security means as described above.

According to a third aspect of the present invention there is provided a cover for use with a spray dispenser means, the cover having a portion arranged to cover a spray tray and dispenser slot in said dispenser means and a sweep member which is adapted so as to sweep past the dispenser slot and thus dislodge any foreign body adjacent the slot, when the cover is moved between closed and opened positions, when in use.

It is an advantage of the present invention that the fraudster can not prevent access to the dispensed banknotes by simply gluing the cover closed.

BRIEF DESCRIPTION OF THE DRAWINGS

An embodiment of the present invention will now be described, by way of example, with reference to the accompanying drawings, in which:

FIG. 2 illustrates the security means of FIG. 1 in an open position.

DETAILED DESCRIPTION

Figure 1:
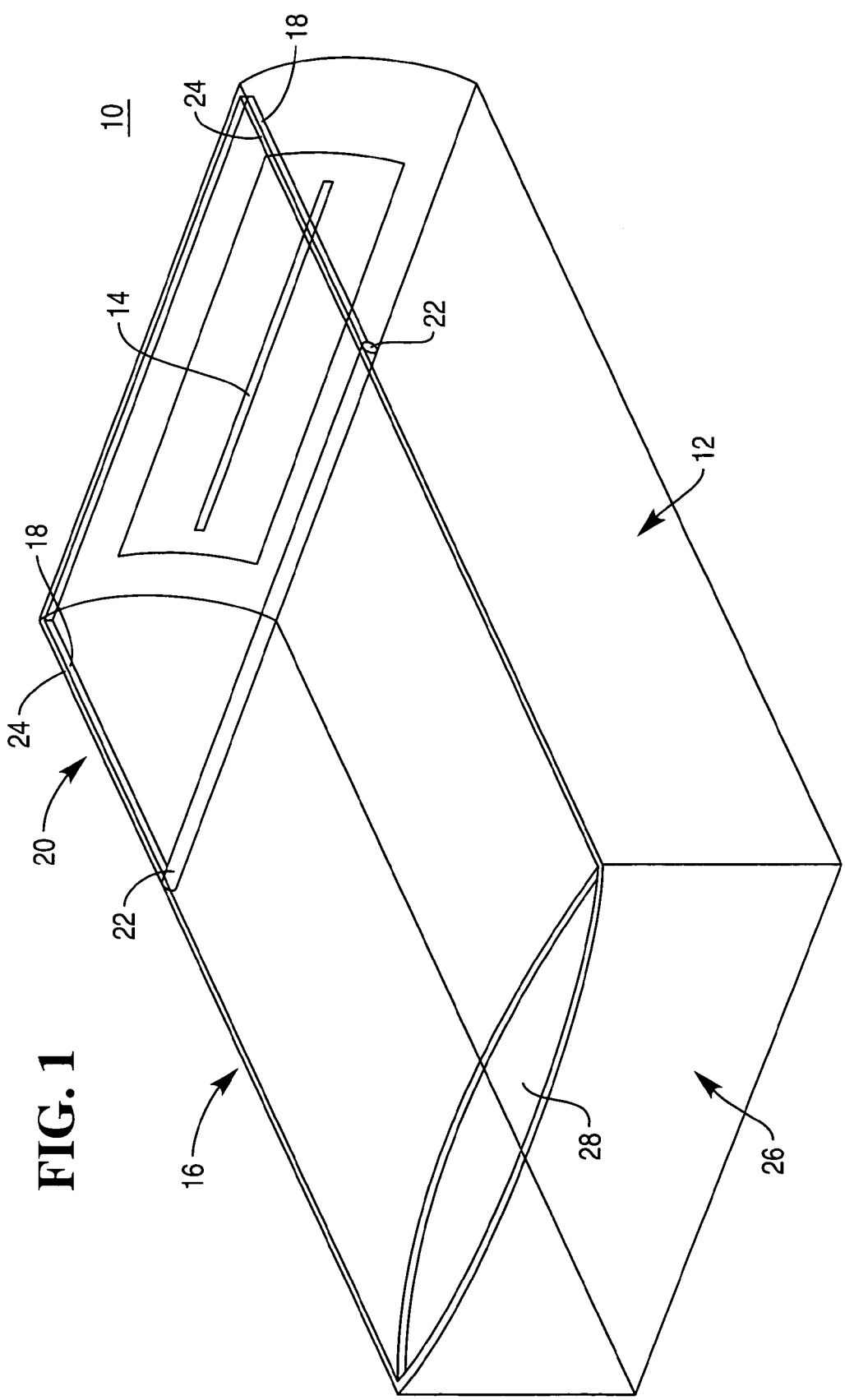
FIG. 1 illustrates a security means in accordance with the present invention in a closed position.

With reference to FIGS. 1 and 2, there is illustrated a security means 10 comprising a spray tray 12 and a dispenser slot 14 positioned so as to dispense media into the spray tray 12. The security means 10 further comprises a security cover 16 positioned to cover the spray tray and slot. The cover 16 is arranged so as to cause a sweep member 18 to sweep past the dispenser slot 14 and thus dislodge any foreign body adjacent the slot, when the cover is moved between closed and opened positions. The sweep member 18 is formed from the rear portion of the lid 20 of the cover between a hinge 22 and the dispenser slot 14.

The cover is further arranged to prevent access to the dispenser slot, when in the opened position. In particular, as can be seen from FIG. 2, the rear portion of the cover 16, between the hinge 22 and the slot 14, is formed from both the sweep member 18 and a stationary member 24, which prevents access to the dispenser slot 14.

The cover 16 is further arranged to enable access to at least a forward portion 26 of the spray tray 12 when the cover 16 is in the closed position. In particular an opening 28 is provided in the front portion of the cover 16, to allow access to the forward portion 26 of the spray tray 12. In this way the fraudster can not simply prevent a valid user from accessing dispensed notes by gluing the cover closed.

The cover is formed from transparent plastic material so that a user can see the notes being dispensed.

The ATM will also have internal dispenser mechanisms, which are involved in the dispensing of banknotes or other media. However, as these do not form a part of the present invention and would be clearly understood by a person skilled in the art they will not be described further herein.

What is claimed is:

1. A security apparatus comprising:
   a first end wall;
   a second end wall lying opposite the first end wall and having a dispenser slot through which media can pass;
   a base portion interconnecting the first and second end walls to form at least in part a spray tray into which media passed through the dispenser slot can be dispensed; and
   a substantially planar-shaped security cover movable between a closed position which covers the spray tray and an opened position which uncovers the spray tray, the security cover including a first edge portion which sweeps past the dispenser slot to dislodge any foreign body adjacent the slot when the cover is moved between the closed and opened positions, the security cover including a second edge portion located opposite the first edge portion and located relative to the first end wall such that a user can access at least a forward portion of the spray tray when the security cover is in the closed position.

2. A security apparatus as claimed in claim 1, wherein the second edge portion of the security cover has an opening through which a user can access media contained in the spray tray when the security cover is in the closed position.

3. An automated teller machine (ATM) comprising:
   a spray tray for containing banknotes;
   a dispenser slot through which banknotes can be dispensed into the spray tray; and
   a security cover pivotably mounted on the spray tray and movable between a closed position which covers the spray tray and an opened position which uncovers the spray tray, the security cover including (i) a first edge portion which prevents a user from gaining access to the dispenser slot when the security cover is in the opened position and which first edge portion sweeps past the slot to dislodge any foreign body adjacent the slot when the security cover is moved between the closed and opened positions, and (ii) a second edge portion having an opening through which a user can access media contained in the spray tray when the security cover is in the closed position.

4. An ATM as claimed in claim 3, wherein the security cover comprises transparent plastic material.

5. A substantially planar-shaped, transparent security cover for use with a spray tray dispenser mechanism having a spray tray and a dispenser slot through which media can pass into the spray tray, the security cover comprising:

a first edge portion which covers the dispenser slot to prevent a user from accessing the slot when the security cover is in an opened position relative to the spray tray; and a second edge portion located opposite the first edge portion such that a user can access at least a forward portion of the spray tray when the security cover is in a closed position relative to the spray tray.

6. A security cover as claimed in claim 5, wherein the second edge portion of has an opening through which a user can access media contained in the spray tray when the security cover is in the closed position relative to the spray tray.

* * * * *